April 1, 1952　　　　F. H. KAYLER　　　　2,590,868
COUPLER BEARING BLOCK ASSEMBLY
Filed July 29, 1948　　　　　　　　　　　　3 Sheets-Sheet 1
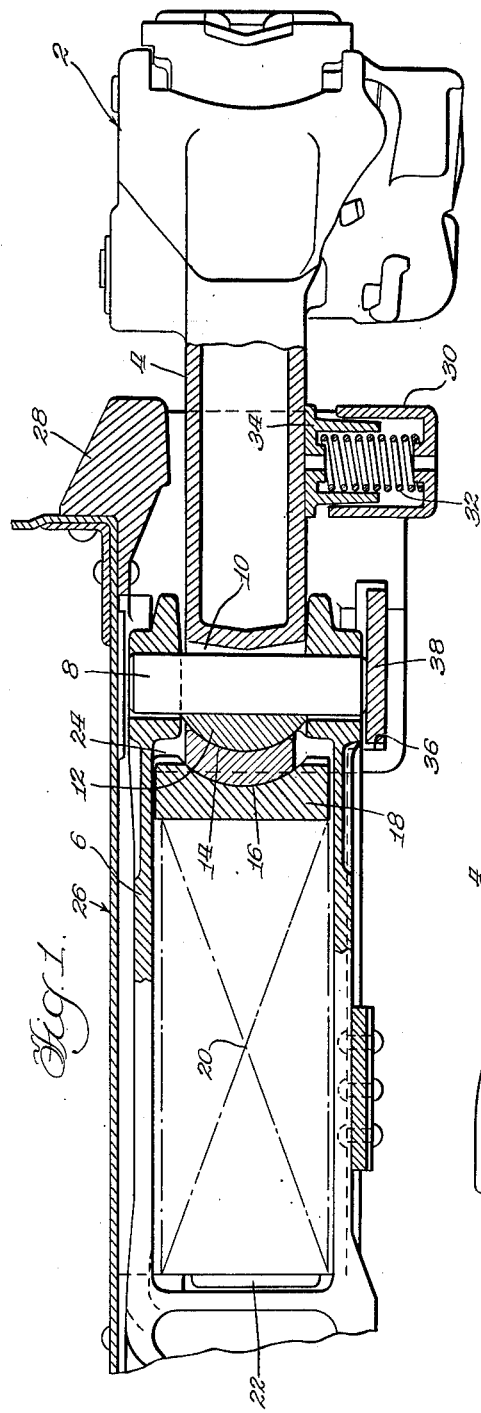
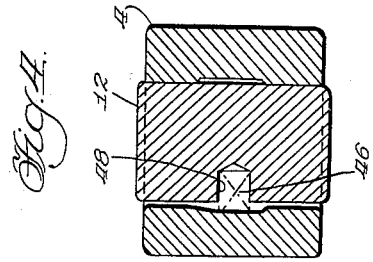
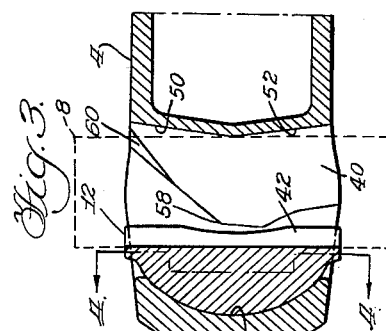
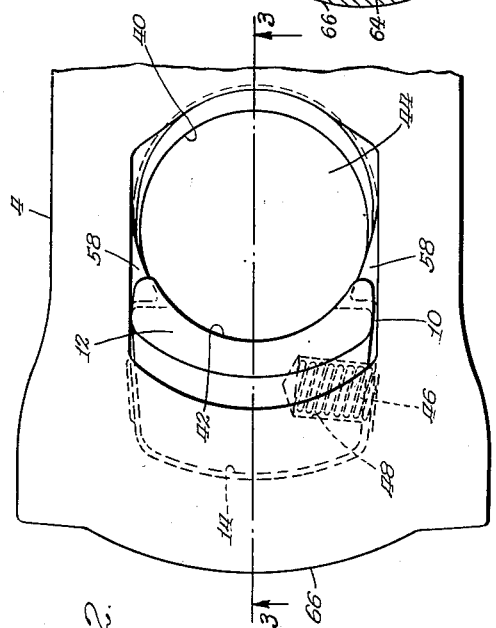
INVENTOR.
Frank H. Kayler
BY
Atty.

April 1, 1952
F. H. KAYLER
2,590,868
COUPLER BEARING BLOCK ASSEMBLY
Filed July 29, 1948
3 Sheets-Sheet 2
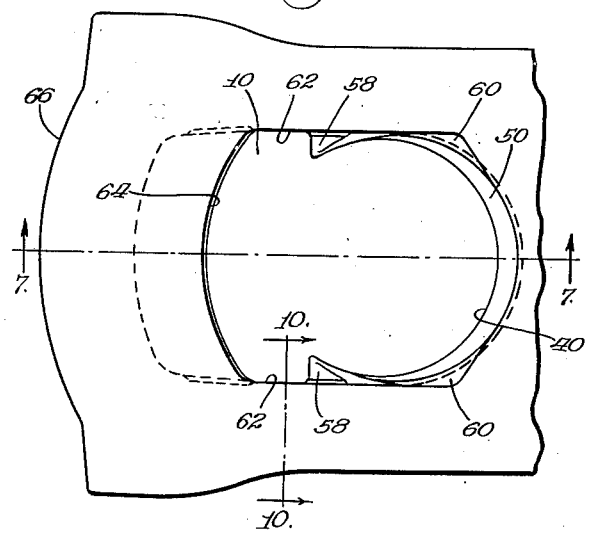
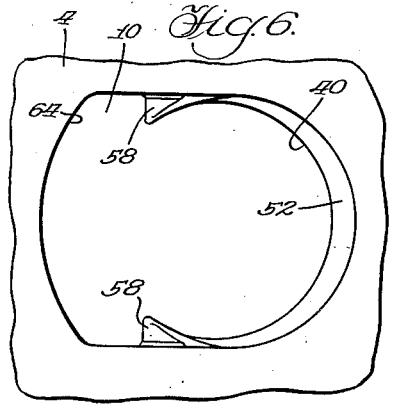
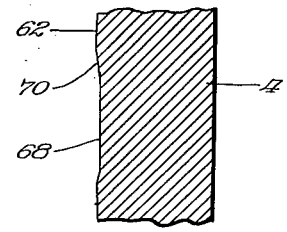
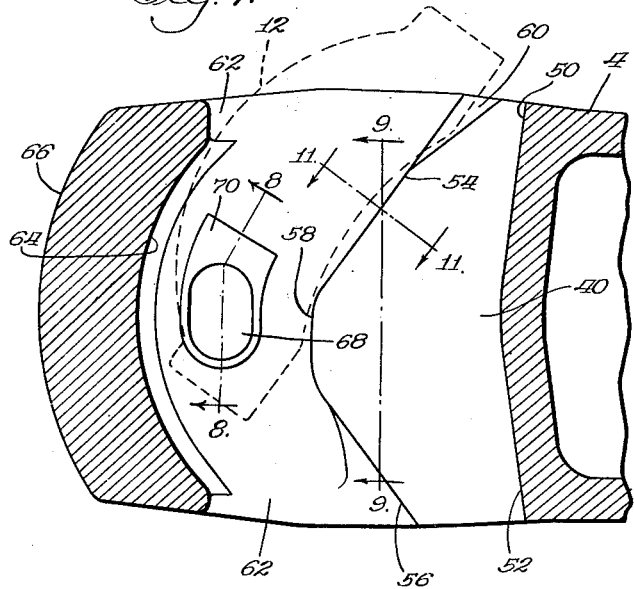
INVENTOR.
Frank H. Kayler
BY April 1, 1952 F. H. KAYLER 2,590,868
COUPLER BEARING BLOCK ASSEMBLY
Filed July 29, 1948 3 Sheets-Sheet 3
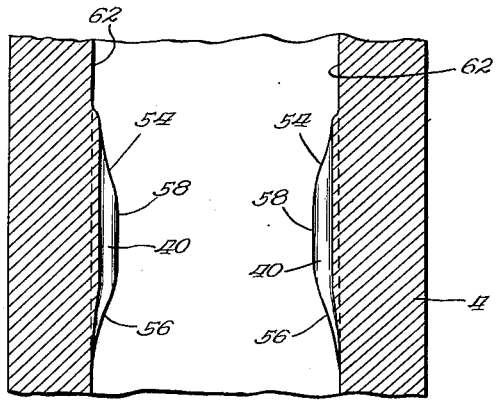
Fig. 9.
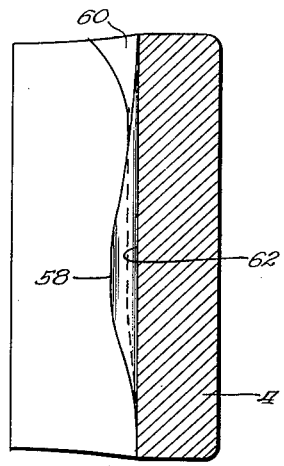
Fig. 10.
Fig. 12.
Fig. 11.
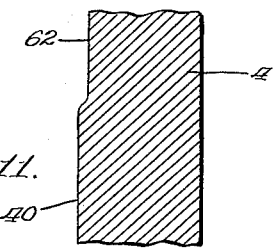
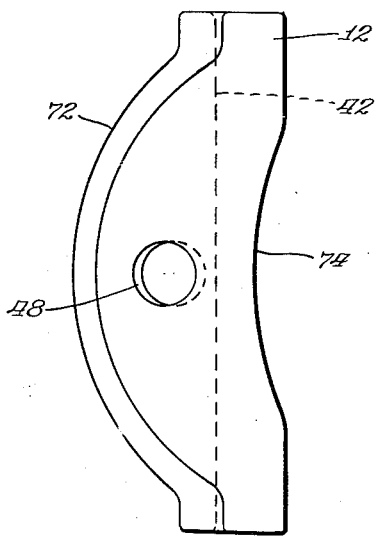
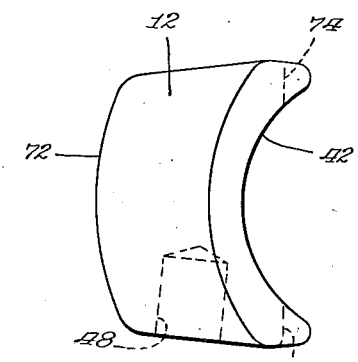
Fig. 13.
INVENTOR.
Frank H. Kayler
BY Patented Apr. 1, 1952

2,590,868

UNITED STATES PATENT OFFICE 2,590,868

COUPLER BEARING BLOCK ASSEMBLY

Frank H. Kayler, Alliance, Ohio, assignor to American Steel Foundries, Chicago, Ill., a corporation of New Jersey Application July 29, 1948, Serial No. 41,191

17 Claims. (Cl. 213—72)

This invention relates to railway car couplers and more particularly to coupler mountings of the type wherein the coupler shank is provided with an opening containing a pin bearing block adapted to cooperate with a pin extending through the opening to accommodate vertical and horizontal angling of the coupler under railway service conditions.

A general object of the invention is to devise a coupler mounting of the above-described type wherein the block is positively held in place within the shank opening to facilitate assembly and disassembly of an associated yoke and to facilitate shipment of the coupler prior to assembly thereof.

A more specific object of the invention is to provide means within the coupler shank opening for accommodating limited rotational movement of the block therewithin and for positively preventing the block from accidentally falling from the shank opening prior to assembly of the pin therein.

Another object of the invention is to devise an arrangement wherein the block and the shank opening are provided with cooperating arcuate faces defining a pin hole, the shank being provided with lugs formed as extensions of its arcuate surfaces and cooperating with complementary recesses in the block to prevent the latter from falling through the shank opening or from falling forwardly into the shank portion of the pin hole.

A further object of the invention is to devise a coupler mounting of the above-described type wherein the bearing block may be entered from the top only of the coupler shank opening.

Still another object of the invention is to provide an arrangement, such as above described, wherein the pin hole portion of the shank opening is provided with arcuate pin bearing surfaces formed and arranged to accommodate top entry of a pin bearing block having substantially the same width as the width of the shank opening.

A different object of the invention is to provide spring means reacting between one side of the block and the adjacent side of the shank opening for tightly maintaining the block in frictional engagement with the opposite side of the shank opening to facilitate assembly and disassembly of the pin, the spring means being formed and arranged to act on the block in a line of force extending at one side of the engaged arcuate thrust surfaces of the block and the rear end of the shank opening thereby positively eliminating any tendency of the block to roll on said surfaces and thus rotate into the pin hole portion of the shank opening.

The foregoing and other objects and advantages of the invention will become apparent from a consideration of the following specification and the accompanying drawings, wherein:

Figure 1 is a fragmentary vertical sectional view partly in elevation of a car body and coupler structure embodying the novel coupler mounting;

Figure 2 is a fragmentary top plan view of the coupler shank and bearing block prior to assembly thereof;

Figure 3 is a sectional view of the structure shown in Figure 2 taken on the line 3—3 thereof, with the pin shown in phantom lines;

Figure 4 is a sectional view on the line 4—4 of Figure 3;

Figure 5 is a fragmentary top plan view of the coupler shank prior to assembly with the bearing block;

Figure 6 is a fragmentary bottom plan view of the coupler shank;

Figure 7 is a sectional view on the line 7—7 of Figure 5 with the bearing block shown in phantom lines during entry of the block into the shank opening;

Figure 8 is a sectional view on the line 8—8 of Figure 7;

Figure 9 is a sectional view on the line 9—9 of Figure 7;

Figure 10 is a sectional view on the line 10—10 of Figure 5;

Figure 11 is a sectional view on the line 11—11 of Figure 7;

Figure 12 is a side elevational view of the novel bearing block; and

Figure 13 is a top plan view of the bearing block.

Describing the invention in detail and referring first to the general arrangement shown in Figure 1, the novel coupler mounting is illustrated as applied to a coupler, generally designated 2, having a shank 4 received within a yoke 6 and secured thereto by a pin 8 extending through an opening 10 in the shank. The opening 10 contains a bearing block 12 slidably engaging the pin 8 and having complementary arcuate thrust engagement as at 14 with the shank 4 at the rear extremity of the opening 10.

The rear end of the shank 4 is in complementary spherical thrust engagement as at 16 with a follower 18 associated with the front end of a conventional draft gear, diagrammatically indicated at 20. The draft gear 20 and follower 18 are contained within the yoke 6 and are confined between a rear draft lug 22 and a front draft lug 24 of a conventional car body structure, fragmentarily indicated at 26.

The structure 26 comprises a casting 28 preferably formed with the front lug 24 and having a pocket 30 containing spring means 32 supporting a carrier plate 34 which affords slidable resilient support for the coupler shank 4. The casting 28 also comprises a slot 36 receiving a bearing plate 38 adapted to afford support for the lower end of the pin 8.

Referring now to Figures 2 to 4 inclusive, the coupler shank 4 and bearing block 12 are illustrated in assembled relationship prior to assembly of the shank 4 with the yoke 6 and pin 8, and it will be seen that the shank opening 10 comprises an arcuate pin engaging surface 40 cooperating with a pin engaging surface 42 of the block 12 to define a substantially round pin hole 44 for the reception of the above-mentioned pin 8. The block 12 is maintained in the preassembly relationship shown in Figures 2 to 4 by a spring 46 carried within a complementary opening or pocket 48 of the block and reacting between one side thereof and adjacent side of the shank opening 10 to urge the block into snug frictional engagement with the opposite side of the opening 10. It may be noted that the pocket 48 extends from one side of the block 12 diagonally inwardly and forwardly toward its pin engaging surface 42 whereby the spring 46, which is positioned by the pocket, acts on the block in a line of force extending at one side of the arcuate thrust surfaces 14. Thus the block, as hereinafter described in detail, may be assembled with the spring bearing against either side of the opening 10.

Referring now to Figures 5 to 11 inclusive, it will be seen that the arcuate surface 40 of the shank 4 is flared toward the top of the shank as at 50 and is flared toward the bottom of the shank as at 52 to accommodate vertical angling of the shank relative to the associated pin 8. The margin of the arcuate surface 40 at each side of the shank opening 10 extends diagonally downwardly and rearwardly as at 54 and extends diagonally downwardly and forwardly as at 56 to define a lug 58 formed as an extension of the arcuate pin engaging surface 40 and the upper edge of the surface 40 at each side of the opening 10 is beveled as at 60 (Figures 7 and 10) to accommodate entry of the block 12, as indicated in phantom lines in Figure 7, inasmuch as the block is approximately the same width as the shank opening 10, as best seen in Figure 2.

The rear extremity of the shank opening 10 which is formed with generally parallel side walls 62 (Figures 5 and 7) is provided with an arcuate thrust surface 64 for complementary thrust engagement with the block as at 14. The surface 64 is preferably in the form of a segment of a sphere and is adapted to accommodate relative sliding movement between the block and the shank during vertical angling of the coupler, the rear end of the shank being formed with a thrust surface 66 in the form of a spherical segment for cooperation as at 16 with the follower 18.

Each side wall 62 of the shank opening 10 is provided with an arcuate recess 68 affording a slidable spring seat or bearing surface for the spring 46 during vertical angling of the coupler and the recess 68 is flared as at 70 to afford a surface diagonal to the spring seat whereby the spring 46 may be urged along the surface 70 as the block 12 is removed from the shank opening 10.

It may be noted, as best seen in Figure 7, that the major portion of each lug 58 is disposed beneath the longitudinal horizontal center line of the shank 4 thereby accommodating the required rotational movement between the block 12 and the shank 4 during vertical angling of the coupler and accommodating top entry of the block 12 although positively preventing removal of the block from the bottom of the shank opening 10. In this manner the block is prevented from falling through the bottom of the opening 10 or from falling forwardly of the opening into the pin hole portion of the shank 4 defined by the arcuate surface 40 thereof. By means of this novel arrangement, the spring 46 may be eliminated without complicating assembly and disassembly of the pin 8, and in the event of failure of the spring 46, the block 12 at all times will be maintained in a position at which the pin 8 may be readily entered into the pin hole 44 defined between pin hole portions 40 and 42 of the pin and block respectively.

Referring now to Figures 12 and 13, the block 12 is illustrated in detail and it will be seen that the block is preferably in the form of a compact steel casting or forging having the before-mentioned cylindrical pin bearing surface 42 and having an arcuate thrust surface 72 complementary to and adapted to cooperate with the before-mentioned surface 64 of the shank 4. One side of the block is formed with the before-mentioned spring pocket 48 disposed intermediate the surfaces 42 and 72, and each side of the surface 42 is interrupted by a recess 74 in the side of the block adapted to receive the associated lug 58. The recess 74 is preferably arcuate in form to accommodate rotational movement between the block 12 and the shank 4 along the thrust surfaces 64 and 72 during vertical angling of the coupler. However, the lugs 58 and the recess 74 are formed and arranged to limit this movement between the block and the shank with respect to downward movement of the block relative to the shank. Thus when the pin 8 is removed from the pin hole 44, the block 12 is positively prevented from rotating downwardly beyond its maximum rotational position relative to the shank 4 required by upward angling of the latter in service whereby the flared portion 52 of the shank surface 40 and the cooperating block surface 42 define a substantially cylindrical passage accommodating insertion of the pin 8, when the block is in its extreme lower position.

Furthermore, as above mentioned, the lugs 58 positively prevent the block 12 from falling forwardly into the pin hole portion 44 of the shank 4 and thus the block 12 is positively prevented from assuming any position within the shank opening 10 which would prevent unencumbered insertion of the pin 8. This novel arrangement also accommodates entry of the shank and block into the yoke 6 without the necessity of manually pushing the block upwardly within the shank opening 10 before entry of the shank into the yoke.

The block 12, as above noted, is symmetrical and thus may be reversed to accommodate entry of either end into the opening 10, without altering the operation of the device.

I claim:

1. A coupler and bearing block assembly comprising a coupler shank having a substantially spherical bearing surface at its rear extremity, an opening through said shank extending from top to bottom thereof, said opening having approximately parallel side walls and an arcuate rear wall, a block in said opening having an arcuate bearing face corresponding to and seated against said rear wall and adapted to accommodate angling of the shank relative to the block, an arcuate surface on said shank at the forward end of said opening, the margin of said arcuate surface at each side wall sloping downwardly and rearwardly from the top of the opening and upwardly and rearwardly from the bottom of the opening to define a lug, said arcuate surface at the forward end of said opening flaring toward the top and bottom thereof, an arcuate surface on the block facing the first-mentioned arcuate surface and defining therewith a pin opening, an arcuate recess in each side of the block receiving the related lug and adapted to accommodate said angling of the shank, and a beveled portion on the first-mentioned arcuate surface extending from the top thereof downwardly along each sloping margin thereof to accommodate entrance and removal of the block at the top of said opening.

2. A coupler and bearing block assembly comprising a coupler shank having a substantially spherical bearing surface at its rear extremity, an opening through said shank having approximately parallel side walls and having an arcuate rear wall, a block in said opening having an arcuate bearing face corresponding to and seated against said rear wall and adapted to accommodate angling of the shank relative to the block, said opening having an arcuate surface at its forward end, the margin of said arcuate surface at each side wall sloping downwardly and rearwardly to a point intermediate the top and bottom of said opening and downwardly and forwardly from said point to define a lug, said arcuate surface at the forward end of said opening flaring toward the top and bottom thereof, an arcuate surface on the block facing the first-mentioned arcuate surface and defining therewith a pin opening, and an arcuate recess in each side of the block receiving the related lug therein.

3. A coupler comprising a shank having an opening extending from top to bottom thereof, said opening having approximately parallel side walls, a block in said opening having complementary arcuate face engagement with said shank for accommodating relative angling thereof, said opening having an arcuate surface at its forward end flaring toward the top and bottom of said opening, the margin of said surface at each side wall sloping downwardly and rearwardly from the top of the opening and upwardly and rearwardly from the bottom of the opening to define a lug intermediate the front and rear extremities of the opening, an arcuate surface on the block facing the first-mentioned surface and defining therewith a pin opening, and spring means housed within the block and compressed thereagainst and against one of said side walls, said block having a recess in each side thereof receiving one of said lugs.

4. An assembly, according to claim 3, wherein the spring means acts on a block in a line of force extending diagonally inwardly from the related side wall toward the pin opening.

5. A coupler and a bearing block assembly comprising a coupler shank having an opening, a block in said opening having slidable engagement at the rear extremity thereof along complementary arcuate bearing faces of said shank and block, an arcuate pin engaging surface at the forward end of said opening, an arcuate pin engaging surface on the block defining a pin hole with the first-mentioned surface, said first-mentioned surface having a portion flaring upwardly and forwardly and having another portion flaring downwardly and forwardly, and stop means carried by the shank within the opening for limiting relative downward movement of the block along said faces to a point whereat its surface defines a substantially cylindrical hole with the second-mentioned portion.

6. A coupler shank comprising a bearing block opening having at one end thereof a vertically curved thrust surface, said opening having at the opposite end thereof an arcuate pin engaging surface extending from top to bottom of the opening and flared toward the top and the bottom of the opening, said pin engaging surface at each side of the opening sloping downwardly from the top of the opening and upwardly from the bottom of the opening to define a positioning lug, the extremities of said pin engaging surface at each side of the block being beveled on the top of the opening.

7. A coupler comprising a shank with a bearing block opening, a bearing block in said opening having slidable engagement with said shank along complementary arcuate bearing faces, arcuate pin engaging surfaces on the shank and block defining a pin opening, and cooperating lug and recess means on the shank and block at each side of said block opening for accommodating relative slidable movement between said shank and block along said faces and for positively limiting movement of the block toward the shank surface.

8. A coupler comprising a shank with a bearing block opening, a bearing block in said opening having slidable engagement with the shank along complementary arcuate bearing surfaces, arcuate pin engaging portions on the shank and block defining a pin opening, and cooperating guide means on the shank and block accommodating relative slidable movement therebetween along said surfaces and preventing the block from entering the pin engaging portion of the shank.

9. A coupler comprising a shank having an opening, a bearing block in said opening having slidable engagement with said shank to accommodate relative angling thereof, arcuate pin engaging surfaces on the shank and block respectively defining a pin opening, a lug integrally formed with the shank at each side of said first-mentioned opening and formed as a continuation of the shank surface, and a recess in each side of the block receiving the related lug.

10. A coupler and bearing block assembly comprising a coupler with a shank having a bearing block opening, a bearing block in said opening having slidable arcuate thrust engagement with said shank, arcuate surfaces on the block and shank respectively defining a pin hole, and cooperating stop means on the shank and block accommodating relative slidable movement therebetween and positively preventing removal of the block from the bottom of said opening.

11. A coupler shank having a bearing block opening defined at its rear extremity by an arcuate bearing face, said opening being defined at its forward extremity by an arcuate pin engaging surface, at least one lateral margin of said surface sloping downwardly from the top of the surface and upwardly from the bottom of the surface to define a block retaining lug.

12. A shank, according to claim 11, wherein the major portion of said lug is disposed below the horizontal center line of the opening.

13. A coupler and bearing block assembly comprising a coupler shank having an opening, a block in said opening having complementary arcuate face thrust engagement with the shank, an arcuate pin engaging surface on the shank at the forward end of said opening, an arcuate pin engaging face on the block defining a pin hole with the first-mentioned pin engaging face, and guide means on the block and shank limiting forward and downward movement of the block relative to the shank.

14. In combination, a coupler shank having an opening, a bearing block in said opening, said block and shank having arcuate surfaces defining a pin hole, the shank surface terminating in a lug recessed within the block to limit downward movement thereof.

15. A coupler shank having a bearing block opening defined at one end thereof by an arcuate bearing face and defined at the opposite side of said opening by an arcuate pin engaging surface, and a lug at each side of said opening formed substantially as a continuation of said pin engaging surface, the major portion of said lug being disposed beneath the horizontal center line of the opening.

16. A coupler shank comprising a bearing block opening defined at one end by a bearing face and defined at the opposite end of said opening by an arcuate pin engaging surface, and lugs formed on said shank and projecting into said opening from opposite sides thereof at points intermediate the ends of said opening.

17. In combination, a coupler shank having an opening, a bearing block in said opening engaging the shank along vertically curved surfaces, said block and shank having horizontally curved surfaces defining a pin hole, said shank having a projection in said opening between the top and bottom thereof and engageable with the block to limit downward movement thereof, the major portion of said lug being disposed beneath the horizontal center line of the opening to accommodate insertion of the block at the top thereof.

FRANK H. KAYLER.

REFERENCES CITED

The following references are of record in the file of this patent:

UNITED STATES PATENTS

| Number | Name | Date |
|---|---|---|
| 2,454,514 | Kayler | Nov. 23, 1948 |